Dec. 9, 1969  R. W. HARMON  3,483,314

LINE POST INSULATOR

Filed Feb. 5, 1968

INVENTOR.
ROBERT W. HARMON
BY
ATTORNEY

3,483,314
LINE POST INSULATOR
Robert W. Harmon, Doylestown, Ohio, assignor to The Ohio Brass Company, Mansfield, Ohio, a corporation of New Jersey
Filed Feb. 5, 1968, Ser. No. 703,055
Int. Cl. H01b 17/40
U.S. Cl. 174—140                    6 Claims

ABSTRACT OF THE DISCLOSURE

A molded resin insulator for electric conductors in which high cost of resin materials is offset by shape of body for minimizing quantity of resin material and by simplified metal fittings comprising an elongate stud for attachment to the support means and a U-bolt for attachment of the conductor arranged for distribution of electrical and mechanical stresses.

---

This invention relates to electric insulators and, more particularly, to plastic insulators for electric power line conductors. A general object of the invention is to reduce the cost and expedite the manufacture of plastic insulators.

With the development of improved plastic materials suitable for use as electrical insulators, specifically the epoxy resins such as bisphenol and cycloaliphatic epoxy resins and the combinations and compounds thereof with various stabilizers, anti-trackants, and fire-retardants, the practical utilization of those materials as insulators in electric power systems has been hindered by the high cost of the materials. The cost of the plastic body including manufacturing operations may be in the order of ten or more times the cost of known useful materials such as porcelain. As a consequence, the adoption of plastic materials as electrical insulators has, to some extent and as a practical matter, been uneconomic and unattractive.

The present invention relates to an arrangement and design of a line post insulator which accomplishes a substantial reduction in the cost of the insulator in the shape and organization of the parts.

The invention will be better understood by reference to the accompanying drawing and the following specification and claims, in which:

Figure 1:
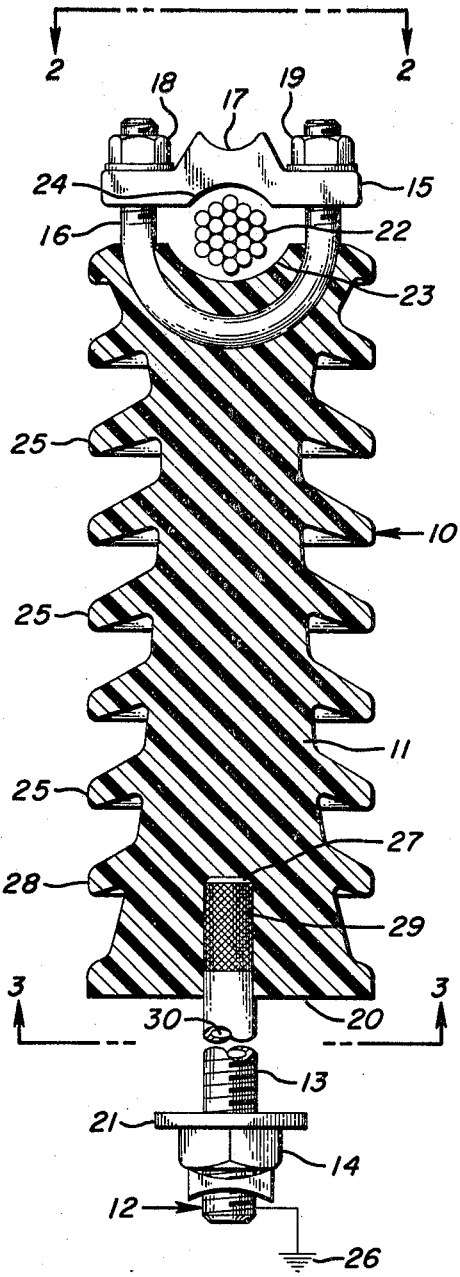
FIG. 1 is an elevation view, partly in section, of the new line post insulator of the invention.
Figure 2:
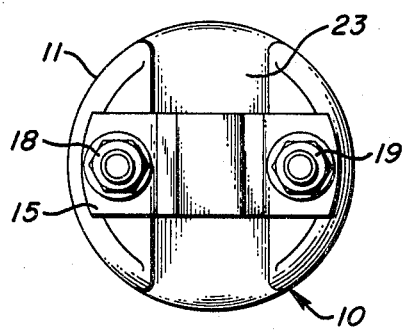
FIG. 2 is a top plan view of the insulator, taken in the direction 2—2 in FIG. 1.
Figure 3:
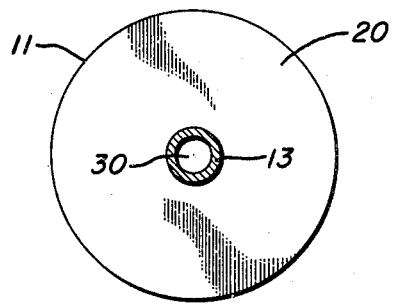
FIG. 3 is a bottom view of the insulator, taken in the direction 3—3 in FIG. 1.

Referring now to FIG. 1, the insulator 10 is constituted as a body 11 comprising a suitably formed monolithic mass of plastic, a pole connector 12 comprising a stud 13 and screw fastener 14, and a conductor connector 15 comprising a U-bolt 16, a metal conductor clamp 17, and screw fasteners 18 and 19. The insulator 10 is adapted to be mounted upon a conductive or insulating support member with the stud 13 received through the member and the end face 20 of the body 11 and the washer 21 compressed against the opposite sides of the member by the screw fastener 14. A line conductor, such as the cable 22, is received in the space defined by the end face 23 of the insulator body 11 and the face 24 of the clamp 17, and compressed between the insulator body and the conductor clamp by the action of the screw fasteners 18 and 19.

The insulator body 11 is constituted as a unitary mass of polymerized resin, such as polyethylene, polystyrene, or polypropylene, formed on the exterior thereof with a plurality of insulating flanges 25 for increasing the exterior surface leakage distance along the insulator between the conductor 22 and the support member, and for forming regions protected against deposition of conductive contaminants, rain and wind-born contaminants, and the like. To this end the flanges 25 are arranged to depend from the insulator body at an angle of about 65 to 75 degrees from the longitudinal axis. Other arrangements of flanges may be utilized in accordance with the considerations set forth in my co-pending application, Ser. No. 617,915, filed Feb. 23, 1967, now abandoned.

In use the insulator 10 is mounted on a wood cross arm or metal pole bracket so that the stud 13 extends through the support member and the body 11 extends either vertically, horizontally, or at some intermediate angle from the member. The conductor 22 is carried at the outer end of the insulator 10 and comprises one conductor of a two or three-wire electric power transmission line, and the stud 13 is connected to a ground 26 of the line.

When so arranged, the plastic body 11 is adapted to resist transverse loads or cantilever loading, so called, imposed by the weight of the conductor cable or by transverse movements of the cable due to vibration, wind, and the like. This results from the fact that the end face 20 of the body 11 engages the support member, such that the body may yield elastically across the face of the body in progressing radially outward from the stud 13. To this end, the interior extremity 27 of the stud 13, located within the lower end flange 28, functions as a mechanical reinforcement of the insulating body against displacements by bending or beam loading due to the weight of the line conductor 22, particularly when the insulator is utilized as a horizontal support means.

The stud 13 has a knurled exterior surface 29 at the interior extremity thereof to increase the tensile strength of the insulator with respect to forces exerted between the pole connector 12 and the body 11 of the insulator. The stud 13 may be constructed as a hollow tubular part having an opening 30 to receive a tail piece of the body 11 along the interior of the stud to provide some increase in the pull strength of the assembly.

The plastic composition suitable for practicing the invention is as follows, given in parts by weight:

| | Parts |
|---|---|
| Epoxy resin | 100 |
| Flexing agent, polypropyleneglycol | 40 |
| Coupling agent, glycidoxy-propyltrimethoxy silane | 3 |
| Hardener, HHPA anhydride | 105 |
| Accelerator, sodium alcoholate | 10 |
| P-quartz, 325 mesh | 380 |
| Hydrated alumina, one micron | 55 |

The resulting insulating body is substantially track-resistant and erosion-resistant, suitable for electrical purposes.

Because of the nature of the loads exerted upon the insulator and because of the arrangement of the stud 13 in the body 11, a composition of plastic material should be utilized such that the material is tough rather than brittle. For example, a composition such as that set forth above having an elastic modulus in the order of $1.6 \times 10^6$ inch-pounds, an ultimate tensile strength in the order of 10,000 pounds per inch$^2$, and a corresponding impact strength suitable for practice of the invention.

The stud 13 and the U-bolt 16 function to distribute electric stresses in and about the plastic body 11 and provide increased voltage withstand capability for a given body or quantity of dielectric material. Thus, the stud 13 provides uniform distribution of electric stresses circumferentially about the insulator at the base end of the insulator, whereas the yoke portion of the U-bolt 16 locates and determines the electrical stresses in and about the body of the insulator with respect to the line conductor 22. It is a feature of the insulator that the breakdown strength is in excess of the breakdown strength of insulators embodying circular end cap and/or end pin construction for a given length of insulator body, while effecting advantageous reductions in cost of the metal fittings.

I claim:

1. An electric insulator for a line conductor, an insulating body comprising a monolithic solid mass of track-resistant and erosion-resistant plastic material, a plurality of annular flanges spaced along the exterior of the body, each comprising an insulating part integral with the body and comprising electric surface-leakage-distance means for the insulator, means for connecting the insulator to a support member at one end of the body comprising a first end face of the body and a stud embedded in the body and extending along the longitudinal axis away from the body and the said end face thereof, and means for securing a line conductor to the insulator at the remaining end of the body comprising a second end face of the body, a U-bolt having the yoke thereof embedded in the body, and means on the arms of the U-bolt exterior to the said body for engagement with the line conductor, the stud at the said one end of the body constituting means for distributing electrical stresses substantially uniformly in the circumferential direction of the body, and the U-bolt distributing electrical stresses on the conductor and adjacent the plastic body.

2. An electric insulator in accordance with claim 1, in which the plastic body has an increasing transverse extent progressing toward the said one end of the body along at least a portion of its length, the said stud comprising a tensile holding means for the said insulator and the said body yielding in the transverse direction thereof by elastic deformation along the said one end face thereof.

3. An electric insulator in accordance with claim 2, in which the stud extends inward to within the adjacent flange for mechanical reinforcement of the body in the transverse direction thereof.

4. An electric insulator in accordance with claim 2, in which the stud is hollow and the plastic body extends into the stud and is engaged with the interior surface thereof.

5. An electric insulator for a line conductor, an insulating body having a top end and a bottom end comprising a monolithic solid mass of track-resistant and erosion-resistant plastic material, a plurality of annular flanges spaced along the exterior of the body, each comprising an insulating part integral with the body and extending at an angle less than perpendicular to the longitudinal axis of the body at the bottom end thereof, an end face at the bottom end of the insulating body shaped for engagement with a support member, an end face at the top end of the insulating body shaped for engagement with a line conductor, means for connecting the insulator to the support member comprising a stud embedded in the body at the said bottom end thereof, and means for securing the line conductor to the insulator, comprising a U-bolt embedded in the body at the said top end thereof.

6. An electric insulator in accordance with claim 5, in which the plastic body is characterized by its toughness, and has an elastic modulus in the order of $1.6 \times 10^6$ inch-pounds and ultimate tensile strength in the order of 10,000 pounds per inch$^2$.

References Cited

UNITED STATES PATENTS

| | | | |
|---|---|---|---|
| 805,167 | 11/1905 | Steinberger | 174—165 |
| 929,132 | 7/1909 | Hill | 174—158 |
| 1,069,782 | 8/1913 | Hilliard | 174—169 X |
| 1,335,801 | 4/1920 | Steinberger | 174—184 |
| 2,092,982 | 9/1937 | Malinovszky | 174—184 X |
| 3,404,218 | 10/1968 | Thompson | 174—177 |

FOREIGN PATENTS

| | | |
|---|---|---|
| 1,199,704 | 6/1959 | France. |
| 1,200,512 | 6/1959 | France. |
| 336,103 | 3/1959 | Switzerland. |

OTHER REFERENCES

Mehmel, German printed application No. 1,034,237, published July 17, 1958.

LARAMIE E. ASKIN, Primary Examiner

U.S. Cl. X.R.

174—165, 168, 177, 212